United States Patent
Kim

(10) Patent No.: US 7,931,247 B2
(45) Date of Patent: Apr. 26, 2011

(54) APPARATUS FOR MOUNTING A JACK DEVICE

(75) Inventor: Sung Hun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 408 days.

(21) Appl. No.: 12/275,076

(22) Filed: Nov. 20, 2008

(65) Prior Publication Data

US 2010/0001158 A1 Jan. 7, 2010

(30) Foreign Application Priority Data

Jul. 2, 2008 (KR) .......................... 10-2008-0064005

(51) Int. Cl.
*A47B 97/00* (2006.01)

(52) U.S. Cl. ........ 248/500; 248/503; 254/122; 254/124; 254/126

(58) Field of Classification Search .................. 248/500, 248/503 E, 352, 357, 680, 310, 316.7; 254/418, 254/122, 124, 126; 280/475, 763.1; 296/37.2, 296/37.3
See application file for complete search history.

(56) References Cited

U.S. PATENT DOCUMENTS

| 4,351,505 | A | * | 9/1982 | Wickersham | ............. | 248/316.7 |
| 7,472,561 | B2 | * | 1/2009 | Biggers et al. | .................. | 62/285 |

FOREIGN PATENT DOCUMENTS

| JP | 51-25376 | | 2/1976 |
| JP | 54-183859 | U | 12/1979 |
| JP | 6-239185 | A | 8/1994 |
| JP | H7-37818 | | 7/1995 |
| JP | 11-20561 | A | 1/1999 |

* cited by examiner

*Primary Examiner* — Ramon O Ramirez

(74) *Attorney, Agent, or Firm* — Morgan, Lewis & Bockius LLP

(57) ABSTRACT

An apparatus for mounting a jacking device is provided, which is fixed to a flat surface of a trunk compartment in a vehicle, and can conveniently mount the jacking device through pushing of the jacking device from the front to the rear. The mounted state of the jacking device is maintained by restraining the jacking device from being moved in all directions. The jacking device mounting apparatus includes a lower plate fixed to a flat surface in a vehicle, on which a jacking device is mounted; an upper plate placed over the lower plate and spaced apart from the lower plate to from a first space therebetween, a center portion of the upper plate being cut to form a second space; a locking pin for locking a forward of the upper plate; and locking-pin fixing brackets for fixing the locking pin.

15 Claims, 8 Drawing Sheets

APPARATUS FOR MOUNTING A JACK DEVICE

CROSS-REFERENCE TO RELATED APPLICATION

The present application claims priority from Korean Patent Application No. 10-2008-64005, filed on Jul. 2, 2008, the entire contents of which is incorporated herein for all purposes by this reference.

BACKGROUND OF THE INVENTION

The present invention relates to an apparatus for mounting a jacking device on a vehicle, and more particularly, to an apparatus which can conveniently fix the jacking device to the vehicle by fixing the apparatus to a proper flat surface on the bottom of a trunk compartment of the vehicle. Pushing the jacking device from the front to the rear, and can provide a stably mounted state of the jacking device by restraining the jacking device from being moved in all directions.

In general, a jacking device or jack has been used as an emergency repair tool when a vehicle breaks down. Such a jacking device is configured to lift a vehicle by a certain height in order to check out or repair the vehicle, and is generally mounted on the flat surface of a trunk compartment of a vehicle.

FIGS. 1A and 1B show a jacking device mounted on a vehicle according to a conventional method.

FIG. 1A is a perspective view illustrating the jacking device mounted on a conventional apparatus for mounting a jacking device, and FIG. 1B is a view illustrating the conventional apparatus for mounting a jacking device in FIG. 1A, with the jacking device being removed therefrom.

As shown in FIGS. 1A and 1B, the conventional apparatus for mounting a jacking device 10 on a vehicle includes a flat surface 20 corresponding to a position on which the jacking device 10 is mounted, and an upper bracket 30 installed over the flat surface 20 and spaced apart from the flat surface 20.

The following process may be performed in order to mount the jacking device 10 on the conventional apparatus for mounting a jacking device.

First of all, the jacking device 10 is inserted in a space formed between the flat surface 20 and the upper bracket 30 positioned over the flat surface 20. A link member 13 is raised to a certain height by rotating a jacking handle 15 provided on a side of the jacking device 10.

In this instance, if the jacking device 10 is raised to a certain height, a compression load is generated between the flat surface 20 and the upper bracket 30. Thus, the jacking device 10 is secured at this position.

More specifically, a conventional method of mounting the jacking device 10 on the vehicle includes inserting the jacking device 10 in the space between the flat surface 20 and the upper bracket 30, and rotating the jacking handle 15 provided on the side of the jacking device 10 to lift the jacking device 10 to a certain height. As a result, a compressive force acts between the flat surface 20 and the upper bracket 30, and thus the jacking device 10 is mounted on the vehicle by the compressive force.

In such conventional methods, if the jacking device 10 is mounted by the excessive compressive force, the upper bracket 30 may bend upwardly. If the jacking device 10 is not fixed at a correct position, the upper bracket 30 may be broken.

In addition, rotating operation of the jacking handle 15 of the jacking device 10 to generate a proper load is cumbersome. Since there is no means for restraining the jacking device 10 from being moved in an insertion direction, the jacking device 10 may be released from the mounted position when the vehicle is suddenly stopped.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, various aspects of the present invention have been made to solve the above-mentioned problems occurring in the prior art while advantages achieved by the prior art are maintained intact.

One aspect of the present invention is to provide an apparatus for mounting a jacking device, which can conveniently attach or detach the jacking device and restrain the jacking device from being moved in all directions to maintain the mounted state of the jacking device, so that when a vehicle is suddenly stopped, the jacking device can prevent accidents due to the release from its position, thereby securing safety.

In order to accomplish these aspects, there is provided an apparatus for mounting a jacking device, according to the present invention, which may include a lower plate fixed to a flat surface of a portion in a vehicle, on which a jacking device is mountable; an upper plate, a rearward portion of which is connected to a rearward portion of the lower plate, wherein the upper plate is placed over the lower plate and elastically biased downwards from the lower plate with a first space therebetween, a center portion of the upper plate being cut to form a second space at a forward portion of the upper plate; a locking pin for locking the forward portion of the upper plate to a forward portion of the lower plate; and a locking-pin fixing bracket for fixing the locking pin, the locking-pin fixing bracket formed at the forward portion of the lower plate.

The second space of the upper plate may be opened forwards.

The lower plate may be welded to the flat surface of the portion in the vehicle.

The forward portion of the upper plate may be spaced from the forward portion of the lower plate in a first predetermined distance. The rearward portion of the upper lower plate may be spaced from the rearward portion of the lower plate in a second predetermined distance. The second predetermined distance may be larger than the first predetermined distance.

The lower plate and the upper plate may be constructed as a single integrated member, and an upper end and a lower end of a side portion connecting the rearward portions of the lower and upper plates are bent, respectively, so that the upper and lower plates serve as a leaf spring.

The upper plate may be formed in a wave shape which is bent along a longitudinal direction thereof.

The locking-pin fixing bracket for locking the locking pin may be formed by bending a portion of the forward portion of the lower plate upwardly.

The locking-pin fixing bracket may include: a first locking-pin fixing bracket for pivotally receiving one end of the locking pin in a left/right direction; and a second locking-pin fixing bracket for receiving the other end of the locking pin in a vertical direction or a front/rear direction therein. The first locking-pin fixing bracket may be provided with a locking hole. The second locking-pin fixing bracket may be provided with at least a locking-pin receiving hole. The at least a locking-pin receiving hole may include: a first locking-pin receiving hole; and a second locking-pin receiving hole, wherein the first locking-pin receiving hole is positioned higher than the second locking-pin receiving hole.

The locking pin may be T-shaped.

In another aspect of the present invention, an apparatus for mounting a jacking device may include: a lower plate fixed to a flat surface of a portion in a vehicle, on which a jacking device is mountable; an upper plate, a rearward portion of which is connected to a rearward portion of the lower plate, wherein the upper plate is placed over the lower plate and elastically biased downwards from the lower plate with a first space therebetween, a center portion of the upper plate being cut to form a second space at a forward portion of the upper plate; a locking pin for locking the forward portion of the upper plate to a forward portion of the lower plate; and a locking-pin fixing bracket for fixing the locking pin, the locking-pin fixing bracket formed at the forward portion of the lower plate, wherein the locking-pin fixing bracket includes: a first locking-pin fixing bracket for pivotally receiving one end of the locking pin in a left/right direction; and a second locking-pin fixing bracket for receiving the other end of the locking pin in a vertical direction or a front/rear direction therein, wherein the second locking-pin fixing bracket comprises a first locking-pin receiving hole; and a second locking-pin receiving hole, wherein the first locking-pin receiving hole is positioned higher than the second locking-pin receiving hole.

With the construction, the vertical movement of the jacking device is restrained by fixing the lower plate to the flat surface of the vehicle, and the front/rear movement of the jacking device is restrained by fastening the locking pin to the locking-pin fixing brackets. In addition, the left/right movement of the jacking device is restrained by the second space formed on the upper plate. Consequently, it is possible to restrain the jacking device from being moved in all directions, thereby maintaining the mounted state of the jacking device stably.

Also, since the jacking device is conveniently fixed by pushing the jacking device in a front/rear direction, the process of mounting the jacking device on the vehicle can be easily performed.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An apparatus for mounting a jacking device or jack according to various aspects of the present invention will now be described in detail with reference to FIGS. 2 to 3.

FIGS. 2A to 2D are views illustrating the construction of an apparatus for mounting a jacking device according to an exemplary embodiment of the present invention.

Figure 1A:
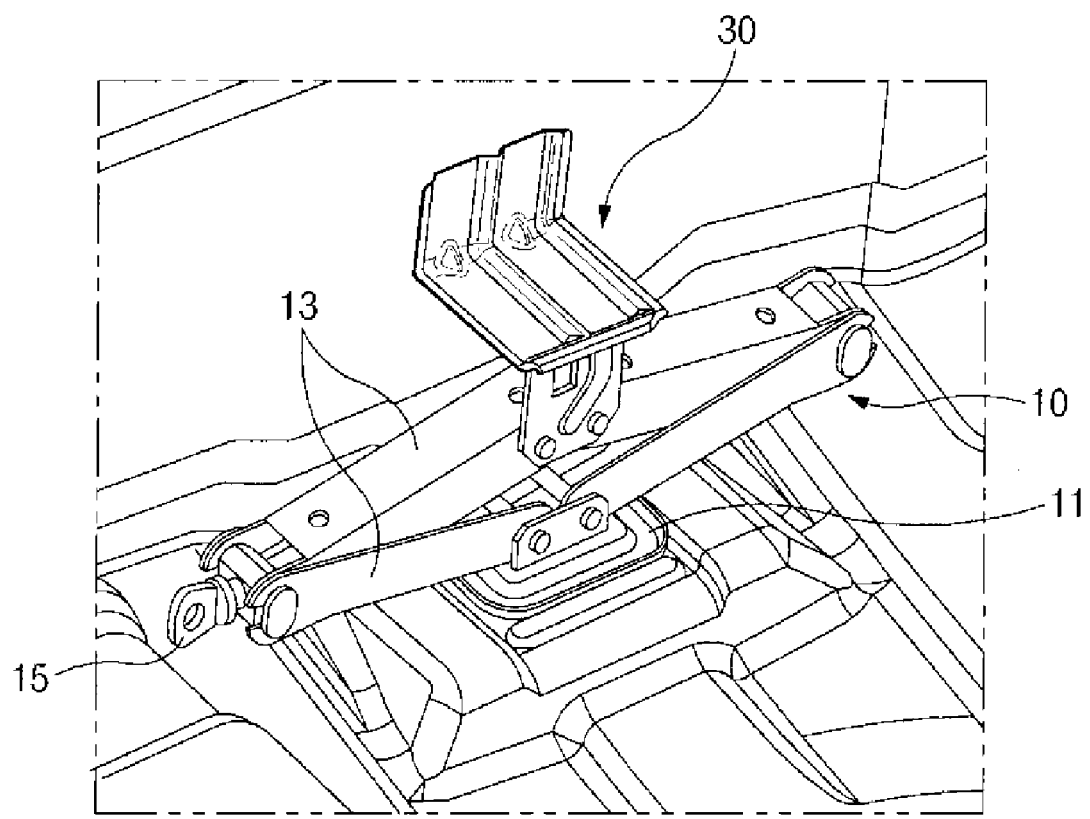
FIGS. 1A and 1B are views illustrating the construction of a conventional apparatus for mounting a jacking device to a vehicle.
Figure 1B:
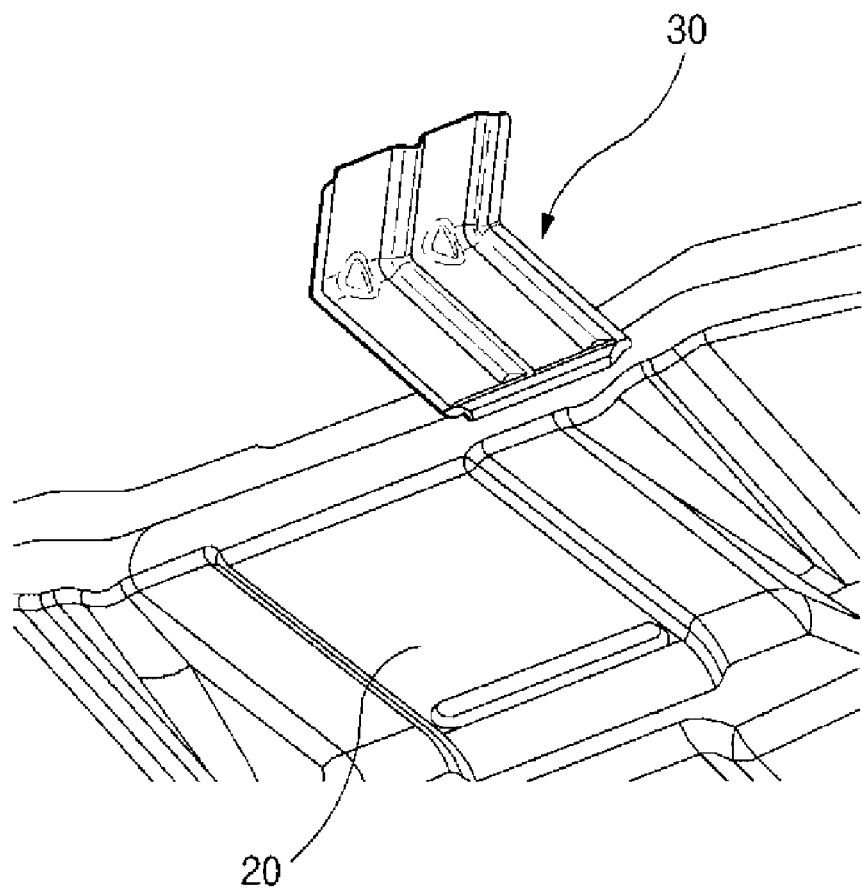
Figure 2A:
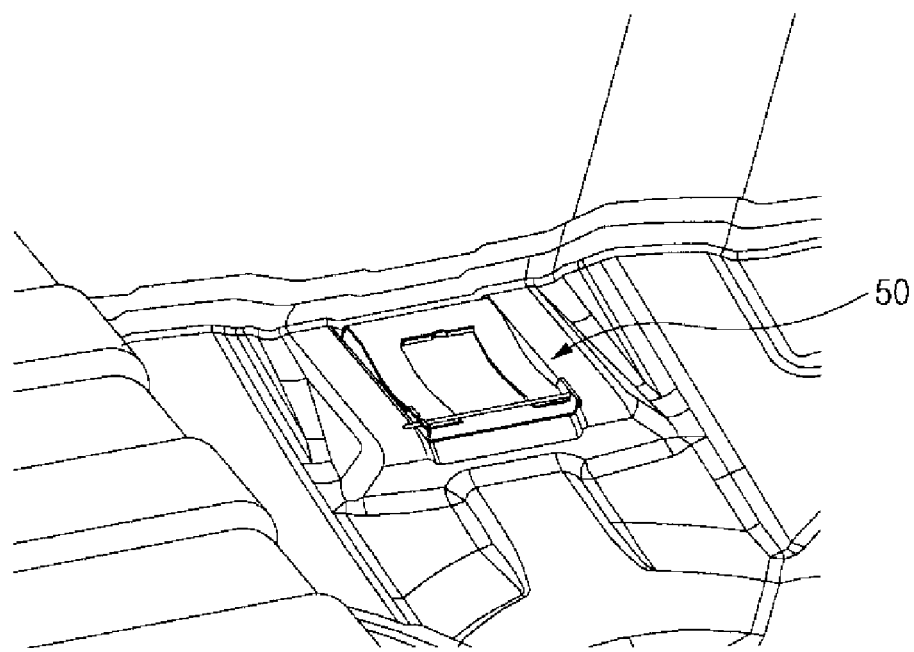
FIGS. 2A, 2B, 2C and 2D are views illustrating the construction of an exemplary apparatus for mounting a jacking device to a vehicle according to various aspects of the present invention.
Figure 2B:
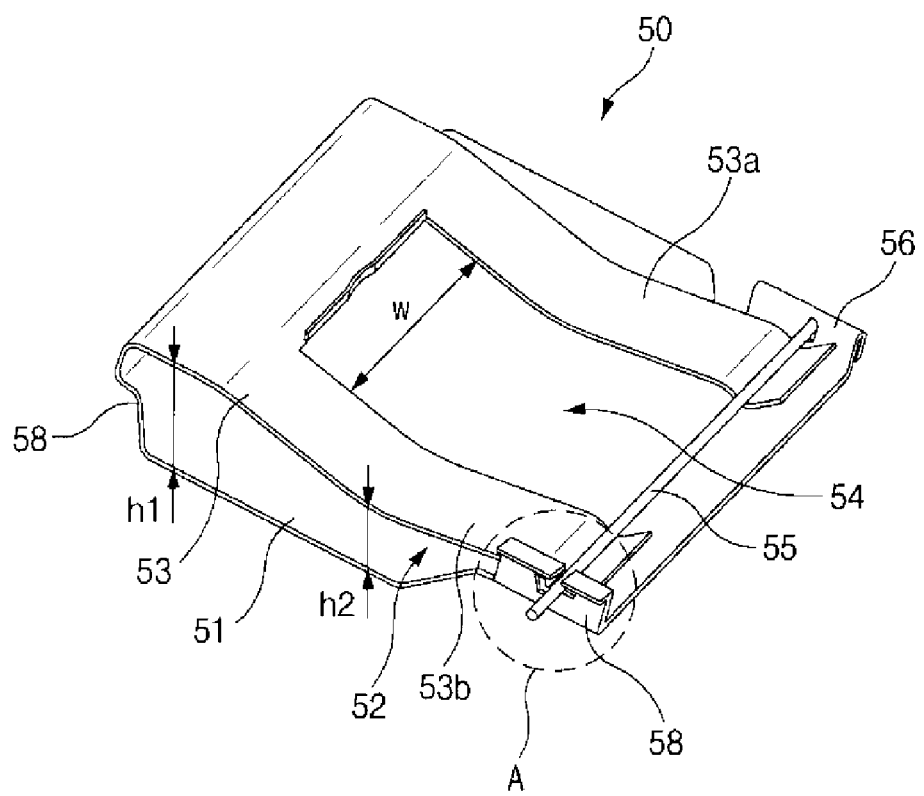
Figure 2C:
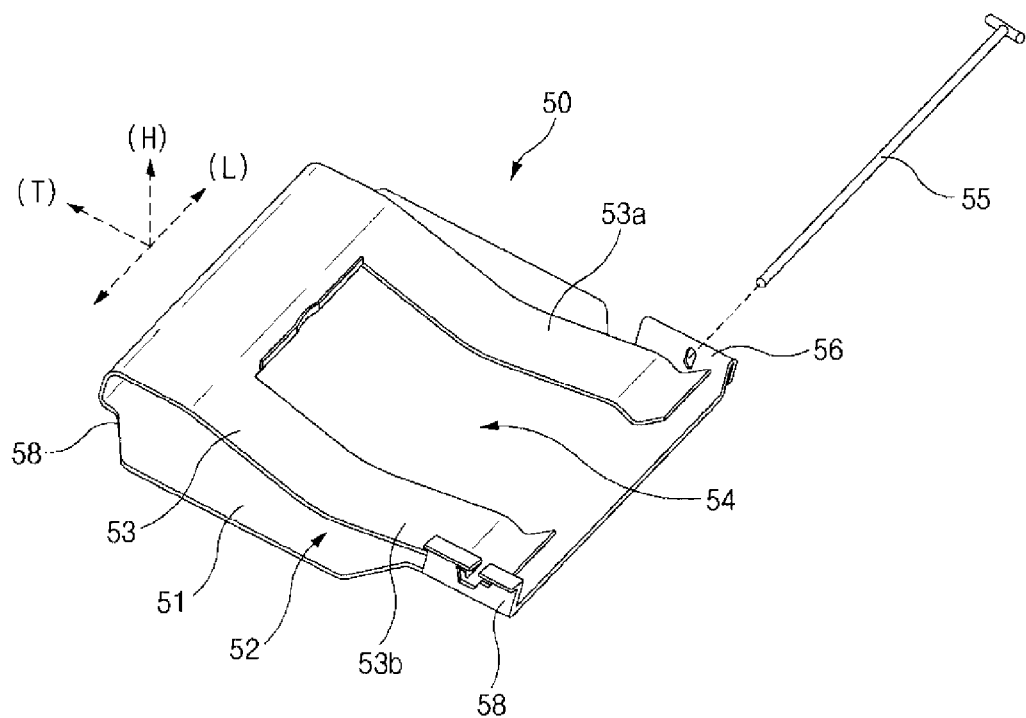
Figure 2D:
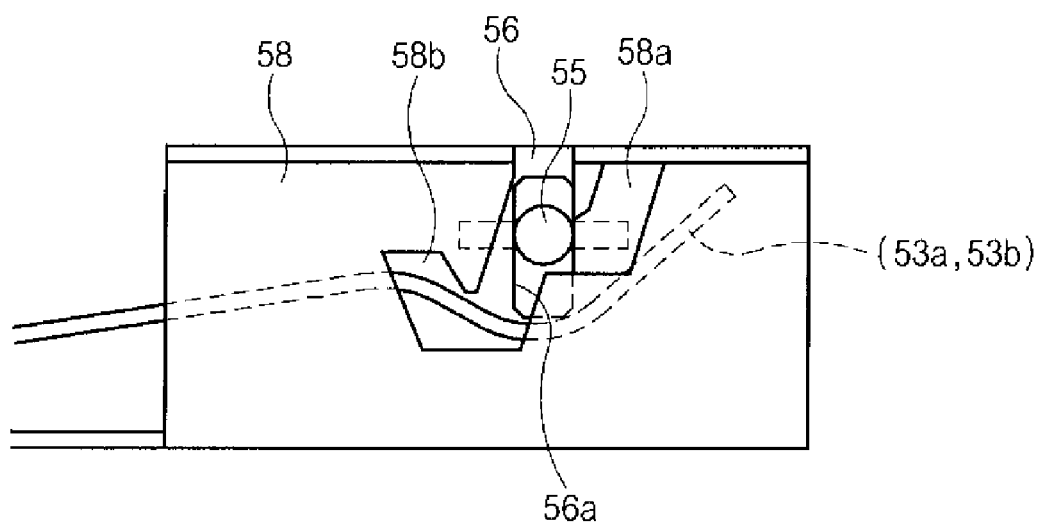

FIG. 2A is a perspective view illustrating the construction of an apparatus for mounting a jacking device according to the present invention, and FIG. 2B is a perspective view illustrating the apparatus for mounting a jacking device according to the present invention. FIG. 2C is a view similar to FIG. 2B, except that a locking pin is separated from the apparatus for mounting a jacking device. FIG. 2D is a view illustrating the construction of a second locking pin fastening bracket in the apparatus for mounting a jacking device according to the present invention.

Referring to FIGS. 2A to 2D, the jacking device mounting apparatus 50 according to the present invention includes a lower plate 51 fixed to a flat surface of a trunk compartment in a vehicle, on which a jacking device 10 is mounted, an upper plate 53 placed over the lower plate 51 and spaced apart from the lower plate 51 at a certain interval to form a first space 52 therebetween, a locking pin 55 for locking a forward of the upper plate 53, and first and second locking-pin fixing brackets 56 and 58 for fixing the locking pin 55.

The lower plate 51 and the upper plate 53 are constructed as a single integrated member, and an upper end and a lower end are respectively bent at a side portion, so that the plates 51 and 53 function like a leaf spring. The upper and lower plates may be monolithically formed. Intervals h1 and h2 between the lower plate 51 and the upper plate 53 are varied depending upon a shape of the upper plate 53.

The first space 52 formed between the lower plate 51 and the upper plate 53 serves as a space for receiving a lower base 11 of the jacking device 10.

The upper plate 53 is formed in a wave shape which is bent along a longitudinal direction thereof. If the upper plate 53 is pressed down by a certain force, the forward of the upper plate 53 comes in contact with the lower plate 51. Consequently, the upper plate 53 serves as a leaf spring.

The center portion of the upper plate 53 is cut from the forward to a portion of the rear end to form a second space 54 of a certain width between lateral wings 53a and 53b. The upper structure of the jacking device 10 protrudes upwards from the second space 54, except for the base 11 of the jacking device 10, which is fastened in the first space 52 (see FIG. 3A).

In the upper plate 53, the locking pin 55 prevents vertical movement of lateral wings 53a and 53b provided on both sides of the second space 54. In this instance, the locking pin 55 is fixed to the first locking-pin fixing bracket 56 and the second locking-pin fixing bracket 58. In an exemplary embodiment of the present invention, the first and second locking-pin fixing brackets 56 and 58 are formed by bending a portion of the forward of the lower plate 51 upwardly.

The locking pin 55 may include a T-shaped forward fixed to the first locking-pin fixing bracket 56, and a straight rear end fixed to the second locking-pin fixing bracket 58, as shown in FIG. 2C.

FIG. 2D shows first and second locking-pin receiving holes 58a and 58b formed on the second locking-pin fixing bracket 58. Preferably, the bracket has two receiving holes, however, one will appreciate that one, two, three, or more receiving holes may be provided.

As shown in FIG. 2D, the locking pin 55 fixed to the second locking-pin fixing bracket 58 may be moved along the first and second locking-pin receiving holes 58a and 58b, in which the locking-pin receiving holes 58a and 58b are formed to have different heights.

For example, when a stronger force pressing the lateral wings 53a and 53b of the upper plate is desired, the locking pin 55 may be placed in the second locking-ping receiving hole 58b, but the force pressing the lateral wings 53a and 53b of the upper plate need not be very strong, the locking pin 55 may be placed in the first locking-pin receiving hole 58a which is positioned at a relatively higher position than the second locking-ping receiving hole 58b.

Figure 3A:
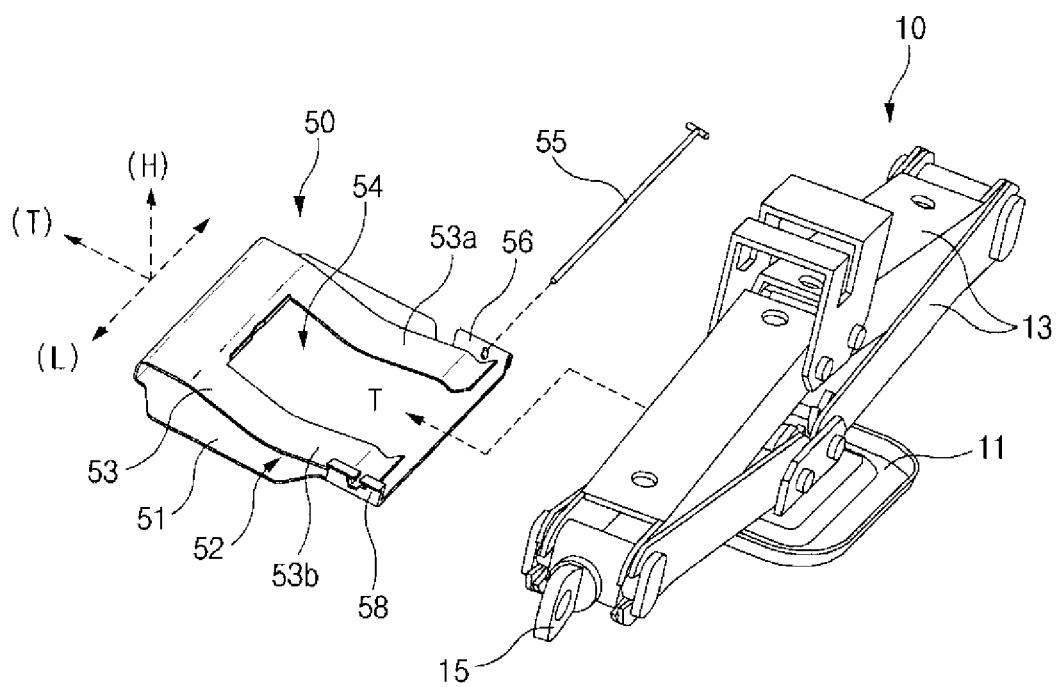
FIGS. 3A and 3B are views illustrating a jacking device mounted to an exemplary apparatus for mounting a jacking device to a vehicle according to various aspects of the present invention.
Figure 3B:
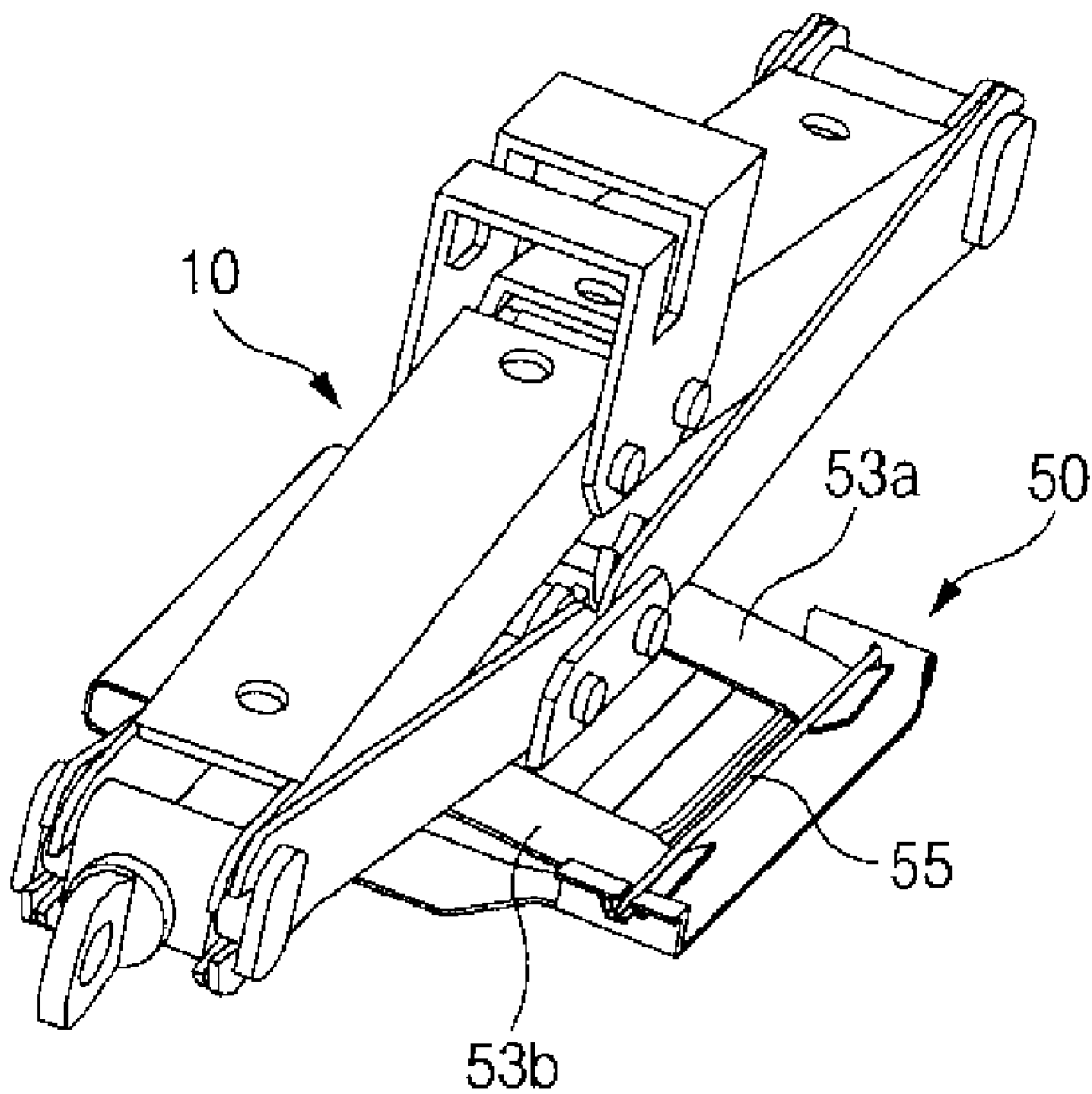

FIGS. 3A and 3B show the process of mounting the jacking device 10 on the jacking device mounting apparatus 50 according to a preferred embodiment of the present invention.

The jacking device mounting apparatus 10 is fixed to the flat surface 20 of the trunk compartment in the vehicle. The lower plate 51 of the jacking device mounting apparatus 50 is welded to the flat surface 20. In this instance, it is preferable to perform spot welding in order to prevent a stepped portion from being produced at a welded portion. Welding is performed at several portions of the lower plate 51 in order to maintain the sufficient coupling strength. One will appreciate that other suitable means may be utilized to secure the lower plate to a surface within the trunk compartment.

Next, the locking pin 55 is released from the locking-pin fixing brackets 56 and 58 in the fixed apparatus for mounting a jacking device.

The jacking device 10 is introduced from the front of the jacking device mounting apparatus 50 to the rear direction (i.e., in a T direction). In this instance, the lower base 11 of the jacking device 10 is inserted in the first space 52 between the upper and lower plates 53 and 51 of the jacking device mounting apparatus 50.

When the jacking device 10 is inserted in the jacking device mounting apparatus 50, the lower base 11 of the jacking device 10 is positioned under the upper plate 53 of the jacking device mounting apparatus 50, and the upper portion of the jacking device 10 protrudes upwardly from the second space 54 formed on the upper plate 53 of the jacking device mounting apparatus 50, except for the lower base 11.

In this instance, the lateral wings 53a and 53b of the upper plate of the jacking device mounting apparatus 50 are positioned over the lower base 11 of the inserted jacking device 10. When the locking pin 55 is fixed in the locking-pin fixing brackets 56 and 58, thereby restraining the jacking device 10 from being moved in the T direction.

More specifically, when the locking pin 55 is fixed to the locking-pin fixing brackets 56 and 58, the lower base 11 of the jacking device 10 is pressed by the lateral wings 53a and 53b of the upper plate of the jacking device mounting apparatus 50.

The locking pin 55 is inserted in left and right directions (i.e., an L direction) through a hole 56a in the first locking-pin fixing bracket 56 to the second locking-pin fixing bracket 58. The second locking-pin fixing bracket 58 is provided with two locking-pin receiving holes 58a and 58b in an exemplary embodiment, so that the straight end of the locking pin 55 can be moved in a vertical direction (i.e., an H direction) or a front/rear direction (i.e., a T direction).

The resilient force of the lateral wings 53a and 53b of the upper plate of the jacking device mounting apparatus 50 created by the locking pin 55 is varied depending upon the positions of the holes 58a and 58b in which the locking pin 55 is moved.

Referring to FIG. 2D, the second locking-pin fixing bracket 58 is provided with first and second locking-pin receiving holes 58a and 58b in various exemplary embodiments.

More specifically, the locking pin 55 is applied with a conventional compressive force, if the locking pin 55 is placed in the first locking-pin receiving hole 58a positioned at a higher position than the second locking-pin receiving hole 58b. When the locking pin 55 is moved to the second locking-pin receiving hole 58b positioned at a position lower than the first locking-pin device receiving hole 58a, the lateral wings 58a and 58b of the upper plate of the jacking device mounting apparatus 50 are applied with more compressive force, thereby more firmly mounting the jacking device.

In this state, the jacking device mounting apparatus 50 prevents the jacking device 10 from being moved in all directions.

More specifically, as shown in FIG. 3A, the front/rear movement (i.e., the T direction) of the jacking device 10 is restrained by the locking pin 55, and the left/right movement (i.e., the L direction) of the jacking device 10 is restrained by the lateral wings 53a and 53b of the upper plate 53.

Also, since the lower plate 51 of the jacking device mounting apparatus 50 according to the present invention is fixed to the flat surface of the trunk compartment by welding, the vertical movement (i.e., the H direction) of the jacking device is restrained.

With the above description, the jacking device is inserted in the jacking device mounting apparatus, and then is locked by inserting the locking pin in the locking-pin fixing bracket, so that the jacking device can be conveniently mounted. Also, since the jacking device mounting apparatus prevents the jacking device from being moved in all directions after the jacking device is mounted, the mounting stability is remarkably improved.

For convenience in explanation and accurate definition in the appended claims, the terms "up" or "upper", "down" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for mounting a jacking device, comprising:
    a lower plate fixed to a flat surface in a vehicle, on which the jacking device is mountable;
    an upper plate, a rear end portion of which is connected to a rear end portion of the lower plate, wherein the upper plate is disposed over the lower plate and elastically biased downwards toward the lower plate with a first space therebetween, a center portion of the upper plate being cut to form a second space at a forward portion of the upper plate;

a locking pin for locking the forward portion of the upper plate to a forward portion of the lower plate; and a locking-pin fixing bracket for fixing the locking pin, the locking-pin fixing bracket formed at the forward portion of the lower plate.

2. The apparatus as claimed in claim 1, wherein the second space of the upper plate opens forwards.

3. The apparatus as claimed in claim 1, wherein the lower plate is welded to the flat surface in the vehicle.

4. The apparatus as claimed in claim 1, wherein the forward portion of the upper plate is spaced from the forward portion of the lower plate in a first predetermined distance.

5. The apparatus as claimed in claim 4, wherein a rearward portion of the upper lower plate is spaced from a rearward portion of the lower plate in a second predetermined distance.

6. The apparatus as claimed in claim 5, wherein the second predetermined distance is larger than the first predetermined distance.

7. The apparatus as claimed in claim 1, wherein the lower plate and the upper plate are constructed as a single integrated member, and an upper end and a lower end of a side portion connecting the rearward portions of the lower and upper plates are bent, respectively, so that the upper and lower plates serve as a leaf spring.

8. The apparatus as claimed in claim 1, wherein the upper plate is formed in a wave shape which is bent along a longitudinal direction thereof.

9. The apparatus as claimed in claim 1, wherein the locking-pin fixing bracket for locking the locking pin is formed by bending a portion of the forward portion of the lower plate upwardly.

10. The apparatus as claimed in claim 1, wherein the locking-pin fixing bracket includes:

a first locking-pin fixing bracket for pivotally retaining one end of the locking pin in a left/right direction; and a second locking-pin fixing bracket for receiving the other end of the locking pin in a vertical direction or a front/rear direction therein.

11. The apparatus as claimed in claim 10, wherein the first locking-pin fixing bracket is provided with a locking hole.

12. The apparatus as claimed in claim 10, wherein the second locking-pin fixing bracket is provided with at least a locking-pin receiving hole.

13. The apparatus as claimed in claim 12, wherein the at least a locking-pin receiving hole comprises:

a first locking-pin receiving hole; and a second locking-pin receiving hole, wherein the first locking-pin receiving hole is positioned higher than the second locking-pin receiving hole.

14. The apparatus as claimed in claim 1, wherein the locking pin is T-shaped.

15. An apparatus for mounting a jacking device, comprising:

a lower plate fixed to a flat surface in a vehicle, on which a jacking device is mountable;

an upper plate, a rearward portion of which is connected to a rearward portion of the lower plate, wherein the upper plate is placed over the lower plate and elastically biased downwards from the lower plate with a first space therebetween, a center portion of the upper plate being cut to form a second space at a forward portion of the upper plate;

a locking pin for locking the forward portion of the upper plate to a forward portion of the lower plate; and a locking-pin fixing bracket for fixing the locking pin, the locking-pin fixing bracket formed at the forward portion of the lower plate, wherein the locking-pin fixing bracket includes:

a first locking-pin fixing bracket for pivotally receiving one end of the locking pin in a left/right direction; and a second locking-pin fixing bracket for receiving the other end of the locking pin in a vertical direction or a front/rear direction therein, wherein the second locking-pin fixing bracket comprises a first locking-pin receiving hole; and a second locking-pin receiving hole, wherein the first locking-pin receiving hole is positioned higher than the second locking-pin receiving hole.

* * * * *